United States Patent
Nagano et al.

(10) Patent No.: US 9,951,705 B2
(45) Date of Patent: Apr. 24, 2018

(54) CONTROL UNIT AND PROGRAM FOR SAME

(75) Inventors: Yuuji Nagano, Chiryu (JP); Yoshinori Ban, Anjo (JP)

(73) Assignee: DENSO CORPORATION, Kariya (JP)

( * ) Notice: Subject to any disclaimer, the term of this patent is extended or adjusted under 35 U.S.C. 154(b) by 1642 days.

(21) Appl. No.: 12/428,573

(22) Filed: Apr. 23, 2009

(65) Prior Publication Data

US 2009/0271804 A1  Oct. 29, 2009

(30) Foreign Application Priority Data

Apr. 23, 2008 (JP) ................... 2008-112627

(51) Int. Cl.
- G06F 9/44 (2018.01)
- F02D 41/24 (2006.01)
- F02D 41/26 (2006.01)
- G05B 19/042 (2006.01)
- G07C 5/08 (2006.01)

(52) U.S. Cl.
CPC ......... *F02D 41/2425* (2013.01); *F02D 41/26* (2013.01); *G05B 19/0426* (2013.01); *G07C 5/085* (2013.01)

(58) Field of Classification Search
None
See application file for complete search history.

(56) References Cited

U.S. PATENT DOCUMENTS

| | | | | |
|---|---|---|---|---|
| 5,442,553 A | * | 8/1995 | Parrillo | 455/420 |
| 5,729,452 A | * | 3/1998 | Smith et al. | 701/31.9 |
| 5,964,813 A | * | 10/1999 | Ishii et al. | 701/29.2 |
| 6,243,627 B1 | | 6/2001 | Ozeki | |
| 6,629,022 B1 | * | 9/2003 | Gessner et al. | 701/1 |
| 7,366,596 B2 | | 4/2008 | Kawauchi et al. | |
| 2002/0147761 A1 | * | 10/2002 | Kawase | 709/107 |
| 2004/0034453 A1 | * | 2/2004 | Funk | 701/1 |

(Continued)

FOREIGN PATENT DOCUMENTS

| | | |
|---|---|---|
| JP | 2000-259420 | 9/2000 |
| JP | 2002-323990 | 11/2002 |
| JP | 2004-118445 | 4/2004 |

(Continued)

OTHER PUBLICATIONS

Japanese Office Action dated Mar. 30, 2010, issued in corresponding Japanese Application No. 2008-112627, with English translation.

(Continued)

*Primary Examiner* — Umut Onat (74) *Attorney, Agent, or Firm* — Nixon & Vanderhye PC (57) ABSTRACT

The first memory of a control unit has a control program stored therein, and an update of the control program is performed at a predetermined timing. After the update of the control program, the second memory in the control unit is referred to, and an event code stored in the second memory is extracted if the event code does not correspond to any one of event code group respectively associated with events that can possibly be generated by the updated control program. Due to the decreased necessity for use as reference data, the extracted event code may be considered as un-necessary and may be deleted, for example, from the memory.

26 Claims, 4 Drawing Sheets

(56) References Cited

U.S. PATENT DOCUMENTS

2004/0168109 A1* 8/2004 Ogura ............................ 714/47
2006/0052919 A1* 3/2006 Hong et al. .................... 701/29

FOREIGN PATENT DOCUMENTS

| JP | 2006-226805 | 8/2006 |
| JP | 2008-169815 | 7/2008 |

OTHER PUBLICATIONS

Title 13, California Code Regulations, Section 1968.2, Malfunction and Diagnostic System Requirements for 2004 and Subsequent Model-Year Passenger Cars, Light-Duty Trucks, and Medium-Duty Vehicles and Engines (OBD II), pp. i-iii; (no date).

* cited by examiner

| DIAG CODE | EVENT |
|---|---|
| 0000 | NO CODE |
| ... | ... |
| 0111 | INTAKE AIR SENSOR OUT OF RANGE |
| 0112 | INTAKE AIR SENSOR SHORT CIRCUIT |
| 0113 | INTAKE AIR SENSOR SNAPPING |
| 0116 | WATER SENSOR OUT OF RANGE |
| 0117 | WATER SENSOR SHORT CIRCUIT |
| 0118 | WATER SENSOR SNAPPING |
| ... | ... |

CONTROL UNIT AND PROGRAM FOR SAME

CROSS REFERENCE TO RELATED APPLICATION

The present application is based on and claims the benefit of priority of Japanese Patent Application No. 2008-112627, filed on Apr. 23, 2008, the disclosure of which is incorporated herein by reference.

FIELD OF THE DISCLOSURE

The present disclosure generally relates to an electronic control unit for use in a vehicle.

BACKGROUND INFORMATION

In recent years, a technique of updating the memory contents of the first and second non-volatile memory in a control unit is proposed. In the proposed technique, the control unit for storing a control program in the first memory in a course of controlling a controlled object, and for storing event codes generated in the course of control of the controlled object performs, as an update process of the control program stored in the first memory is performed, initialization of all of the memory areas in the second memory. The technique is disclosed in, for example, Japanese patent documents JP-A-2002-323990 and JP-A-2004-118445.

However, the above technique deletes all event codes stored in the second memory in the process of updating the control program stored in the first memory. Therefore, the deleted event codes can not be referred to after the deletion.

If all memory areas in the second memory are configured not to be initialized in the process of updating the control program in the first memory, the event code corresponding to an event that will not be generated any more by the updated control program may be left unchanged in the second memory.

The event code corresponding to the event that will not be generated any more by the updated control program is considered as less necessary or un-necessary for reference, and is desirable to be identified. By identifying the un-necessary event code, the event code can be easily deleted, for example.

SUMMARY OF THE DISCLOSURE

In view of the above and other problems, the present disclosure provides a control unit or a technique that identifies, as a un-necessary code, an event code that corresponds to a no-more-generated event by a control program after a control program update. In other words, the event code corresponding to the event that can possibly be generated any more by the updated control program is identified as the un-necessary code for the purpose of for example, deletion from the non-volatile memory.

In an aspect of the present disclosure, a control unit having a control program stored in the first non-volatile memory for controlling a controlled object and storing in the second non-volatile memory an event code generated in the controlled object is configured to be controlled in the following manner.

That is, after the update of the control program in the first memory, from among the event codes stored in the second memory, the event code that does not match with any one of an event code group corresponding to a group of events that can possibly be generated by the updated control program is extracted by an extraction unit, and the extracted event code is determined as an un-necessary event code by a determination unit.

In the control unit described above, an event code that is not included in the event code group corresponding to a group of events that can be generated by the updated control program is extracted from among the event codes stored in the second memory, after the update of the control program that is stored in the first memory.

The update of the control program stored in the first memory causes a change in the event code group that includes a group of events that can possibly be generated by the updated control program. That is, some of the event code stored in the second memory and not found in the event code group no longer correspond to any one of the events that can possibly be generated by the updated control program. In other words, the necessity of that not-found-in-the-event-code-group event code is decreased, or the event code is considered as un-necessary in terms of reference.

Therefore, in the above configuration, the extracted event code can be identified as the un-necessary event code that is no longer required to be stored in the second memory. As a result, the identified code can be easily deleted, for example, from the second memory in a selective manner. More practically, the identified code can be displayed on a display unit of an external device, or can be transmitted to the external device.

The above-described operation scheme may be implemented by a program product stored in a computer-readable storage medium that controls a computer to be serving as those components or units in the above description.

The program product controls the computer to be serving as a machine that realizes the intended results in the above description.

Further, the program product includes a series of instructions or acts to suitably control a computer, or a network of computers, and may be provided for a user by using various storage media, or through communication line.

BRIEF DESCRIPTION OF THE DRAWINGS

Objects, features, and advantages of the present disclosure will become more apparent from the following detailed description made with reference to the accompanying drawings, in which.

DETAILED DESCRIPTION

An embodiment of the present disclosure is described below with the drawing.

(1) Structural Configuration

Figure 1:
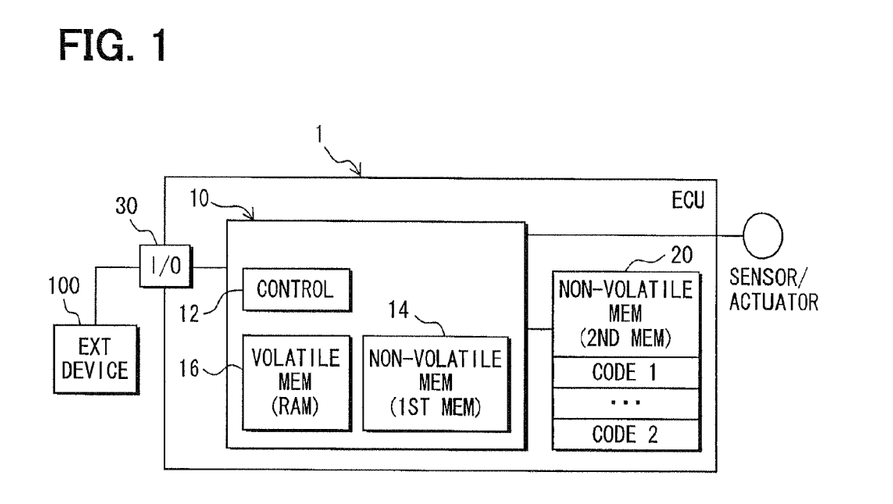
FIG. 1 is a block diagram of a control unit in an embodiment of the present disclosure.

The control unit 1, a so-called ECU (Electronic Control Unit), is used to control controlled objects through such as a sensor, an actuator and the like. That is, the control unit 1 is implemented as a part of the ECU. The control unit 1 includes, as shown in FIG. 1, a microcomputer 10, a non-volatile memory 20, an input/output interface 30 and the like. More specifically, the microcomputer 10 controls the entire operation of the control unit 1, and the memory 20 stores various information, in a writable and erasable manner that is characteristically realized by an EEPROM (Electrically Erasable Programmable ROM).

More specifically, in the present embodiment, the behavior of a vehicle is considered as the controlled object, and the behavior of the vehicle is controlled by the operation of the actuators based on the detection results of the various sensors.

The microcomputer 10 includes a controller 12 for executing various processing, a non-volatile memory 14 (implemented as a ROM in the present embodiment) for storing event codes (described later in detail) and various programs, and a volatile memory 16 (implemented as a RAM in the present embodiment). In addition, the non-volatile memory 14 stores control programs for controlling the controlled objects and functional programs that provides required function of the present disclosure.

The I/O interface 30 is an interface to connect an outside system 100 (an external device 100 in FIG. 1, that is, a so-called scan tool or the like) for reading the event code which is memorized in the non-volatile memory 20 or volatile memory 16 through the microcomputer 10.

In the following description, for illustration purposes, the non-volatile memory 14 of the microcomputer 10 is designated as a first memory 14, the non-volatile memory 20 which is capable of adding memory contents is designated as a second memory 20, and the volatile memory 16 which is capable of maintaining memory contents is designated as a third memory 16.

(2) Processing of a Microcomputer

Processing executed by the control unit 12 of the microcomputer 10 according to the function program memorized in the first memory 14 is described in the following.

(2-1) Code Store Processing

Figure 2:
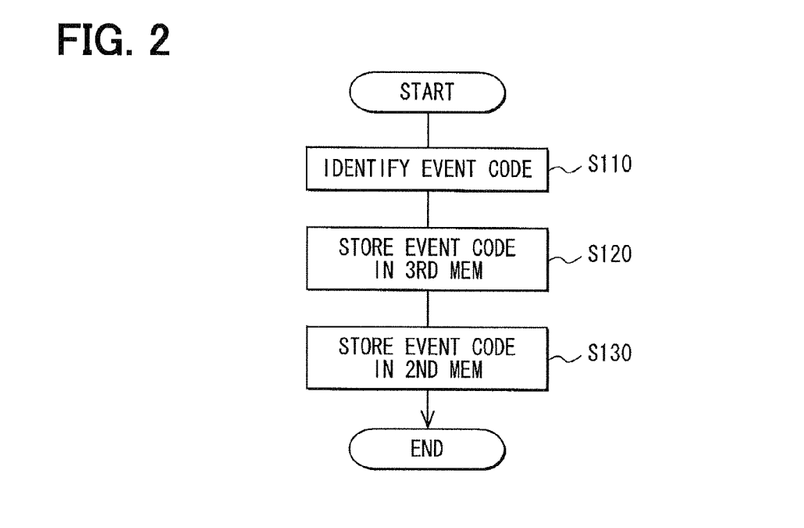
FIG. 2 is a flow chart of a process for storing event codes in the embodiment of the present disclosure.

First, code store processing which is started up when a situation is determined, based on the sensor detection results, that an event (i.e., an abnormality in the present embodiment) is caused in the control unit 1 or in the controlled object is described with reference to FIG. 2.

When the code store processing is started up, an event code that corresponds to the event that has been caused prior to the starting up of the processing is identified based on the data table which is memorized in the first memory 14 (S110).

Figure 3:
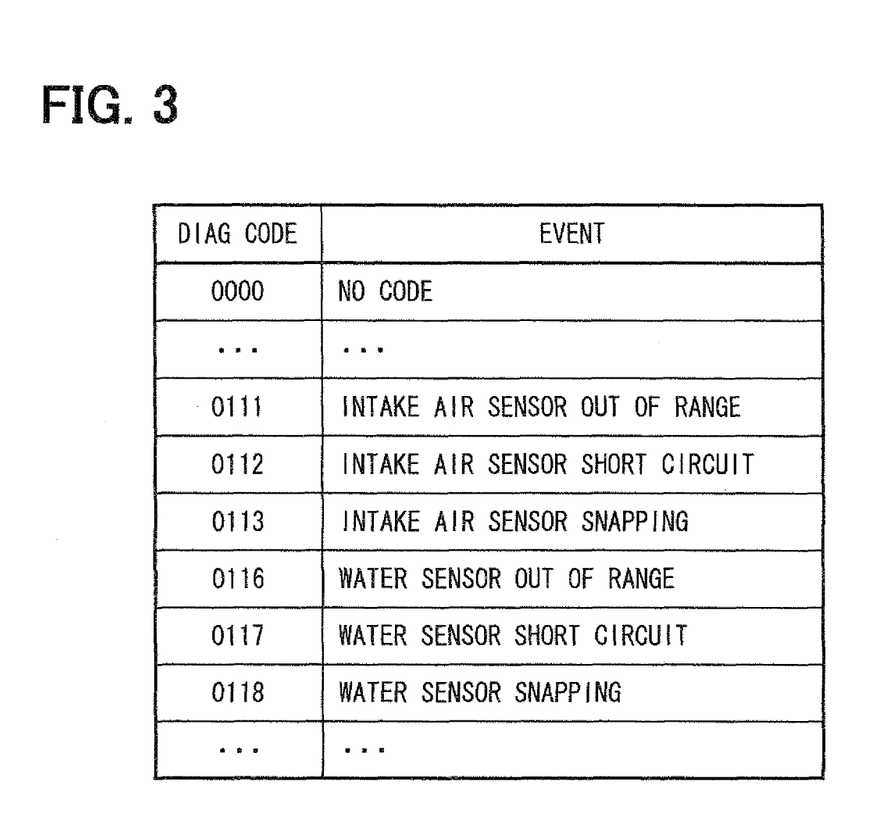
FIG. 3 is a diagram of a data table for showing a data structure in the embodiment of the present disclosure.

The event (i.e., the abnormality) in the controlled object or in the control unit 1 and the event code (e.g., a diag code, or a diagnostic trouble code in un-abridged spelling, as well as a code for trouble analysis such as a freeze frame data or the like) corresponding to that event are, as shown in FIG. 3, registered in the data table in association with each other as a reference.

The event codes in the data table may be stored by using different format. That is, for example, the data structure for storing the event code may be that, each of the event codes is stored in each of one or more memories in association with an event that can possibly be generated in the controlled object or in the control unit 1. The event code may be, in that case, identified from among the event codes, that is, a set of the event codes, or a group of the event codes, stored in one of above-described manners.

Next, the event code which is identified in S110 is memorized in an area for event code in the third memory 16 (S120).

Then, the event code which is identified in S110 is memorized in the event code area in the second memory 20 (S130). In this case, the processing for storing the event code to the second memory 20 may be executed under various conditions. For example, it may be executed upon detecting the turning-off of the ignition key switch of the vehicle.

(2-2) Un-Necessary Code Identification Processing

Next, processing for determining a un-necessary code which is started up at a fixed timing after starting-up of the microcomputer 10 is described with reference to FIG. 4.

In the present embodiment, the data table and the control program memorized in the first memory 14 are updated under an instruction from the outside system 100, and the update of the data and the program is accompanied by a storage of information in the first memory 14, the information that is indicative of the performed update. The update is performed assuming that the first memory 14 is a rewritable memory such as, for example, a flash ROM or the like. Further, the un-necessary code identification processing is started up at a timing of storage of the above information, that is, at a timing of start-up instruction from the outside system 100 in a condition that the control program has been updated.

Further, the update of the control program may be determined as complete when at least one of the instructions from the outside system 100 is received, that is, when either or both of the instruction for starting the control program update and the instruction for staring the un-necessary code identification processing is received, in case the outside system 100 instructs to start the update of the control program and the un-necessary code identification processing one by one. Furthermore, the data amount change due to the update of the control program may be detected for determining the completion of the update.

When the un-necessary code identification processing is started up, each of the event codes which is memorized in the second memory 20 is read (S210). If an event code to be read is not specified in the instruction from the outside system 100, the reading of all of the event codes is attempted. If the event code is specified in the instruction, the reading of only the specified event code is attempted.

Then, whether the event code has been read from the second memory 20 is examined (S220), and the process determines that there is no un-necessary code stored in the second memory 20 (S230) if the event code has not been read (S220:NO). Then, the determination result is notified (S240) and the process concludes itself.

In S240, the determination result is either transmitted to the outside system 100 or other system that is communicative with the control unit 1 (the system 100 and other system are collectively designated as external systems hereinafter), displayed on a display unit of the control unit 1, or stored in a memory area of some memory that is accessible from the external systems such as the outside system 100 or the like.

Also, if an event code has been read from the second memory 20 in S210 (S220:YES), an event code group is read from the data table which is memorized in the first memory 14 (S250).

Next, from among the event codes read in S210, an event code that does not match with any of the event code read as the event code group in S250 is extracted (S260).

If no event code is extracted in S260 (S270:NO), the process proceeds to S230, and determines that there is no un-necessary event code.

On the other hand, if an event code is extracted in S260 (S270:YES), the extracted event code is identified as the un-necessary event code which is not required to be memorized in the second memory 20 (S280).

When the control program which is memorized in the first memory 14 has been updated as described above, the event code group, which includes a set of event codes respectively in association with possible events caused by the updated program, is also updated (i.e., changed) due to the update of the data table. In that case, the event codes stored in the second memory 20 may have an event code that is not included in the event code group in the data table, and that not-included event code does not correspond to any event that can possibly be generated by the updated control program. Therefore, the not-included event code is considered as an un-necessary event code. That is, in S280, the not-included event code is identified as the un-necessary code.

Next, the identification result in S280 is notified (S290). Just like the process in S240 described above, the identification result is either transmitted to the external systems, displayed on a display unit of the control unit 1, or stored in a memory area of some memory that is accessible from the external systems, for the purpose of notification. After the notification, one of the relevant external systems waits in a condition, which waits for an operation for instructing the control unit 1 to delete the event code that is identified in the identification result. When the operation is performed, the relevant external system transmits a delete instruction to the control unit 1.

Whether or not the delete instruction transmitted from the external system side is received before a preset time elapses posterior to the identification notification is then examined in S300.

If the delete instruction has not been received (S300:NO), the un-necessary code identification processing immediately concludes itself. If the delete instruction has been received (S300:YES), the identified code that is identified in S280 is deleted from the second memory 20 in S310, and the processing is concluded. When the un-necessary code identification processing is concluded, the update information indicative of the update of the control program stored in the first memory 14 may also be deleted.

In the above-describe operation scheme, the event code is deleted after reception of the delete instruction by the control unit 1 from the external system. However, the event code may be deleted regardless of the delete instruction. That is, in other words, the process may skip S300 to proceed to S310.

Further, the extraction of the event code in S260 may be considered as identical with the identification of the un-necessary event code in S280, or the completion of event code extraction in S260 may be considered as identical with the identification of the un-necessary event code in S280. In this case, the comparison between the event code and the event code group in S260 can be considered as an embodiment of an extraction unit, and an output of the un-matching based on the comparison results can be considered as an embodiment of a determination unit.

(2-3) Modification of Un-Necessary Code Identification Processing

The above-described un-necessary code identification processing can be modified in the following manner. That is, only a part of the processing implemented by the above-described function program in the first memory 14 is modified. Therefore, the following description mainly describes those modifications.

Figure 5:
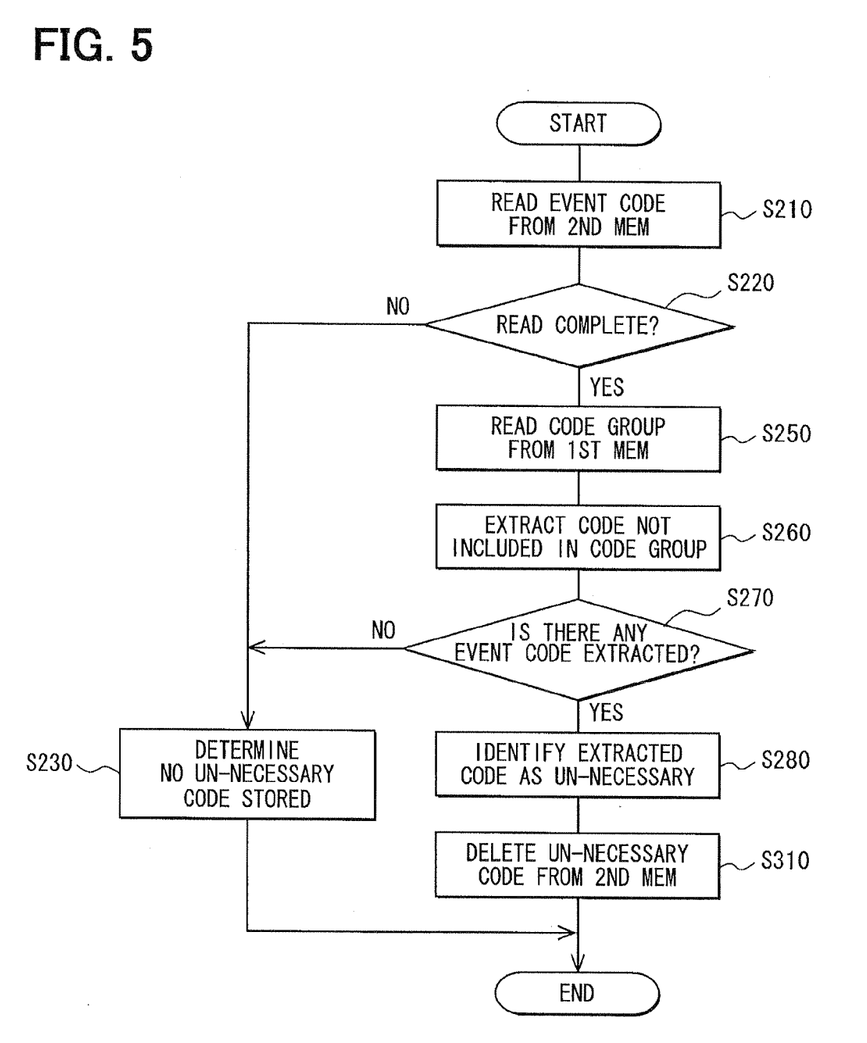
FIG. 5 is a flow chart of a modification of the un-necessary code identification process in the embodiment of the present disclosure.

The modified un-necessary code identification processing is started up at one of the following timings (a) to (d) after the information regarding the update of the control program is stored in the first memory 14.

(a) A timing when the microcomputer 10 of the control system 1 is started or re-started (b) A timing when the controlled object enters into a stably-controlled condition after getting out of a transitional condition of control start time (c) A timing when the control unit 1 has completed processing for diagnosis of the controlled object (i.e., so-called readiness status or the like)

(d) A timing when the control program is updated, or when a preset time has elapsed after the control program update The timing may be selected based on a criterion that the processing load of the control unit 1 does not become excessive. Also, the above timings may be used in a combined manner.

The arrival of the above (b) timing is determined based on the control condition of the controlled object by the control unit 1, and/or based on the elapsed time after the start of the control. The arrival of the above (c) timing is determined based on the completion of the processing of diagnosis by the control unit 1, or the storage of information that is indicative of that completion of the processing to the memory.

In the modified un-necessary code identification processing, S240 is not performed after the processing of S210 to S230.

Further, after the processing of S210 to S280, S290 and S300 are skipped.

However, S240, S290, S300 may be performed in the modified processing.

(3) Advantageous Effects

The advantageous effects of the embodiment are described one by one in the following. According to the above operation scheme, the control unit 1 extracts, from the second memory 20, the event code that is not included in the event code group having the event codes respectively corresponding to the possibly generated events by the update control program after the update of the control program in the first memory 14 (S260 in FIGS. 4 & 5).

After the update of the control program in the first memory 14, the event code group corresponding to the events possibly generated by the updated program is also updated or changed. Therefore, some of the event codes in the second memory 20 may come to have no correspondence with any event that can be generated by the updated control program, thereby losing its necessity in terms of reference in the subsequent processing.

Figure 4:
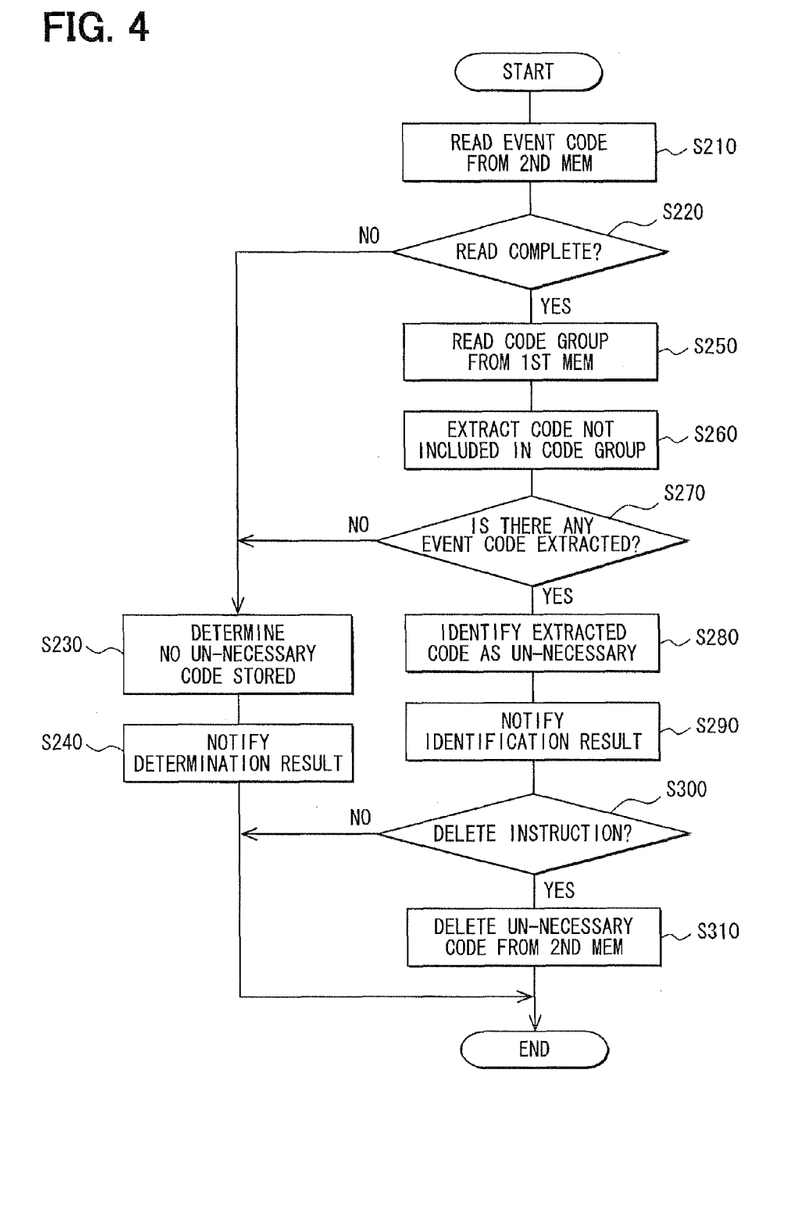
FIG. 4 is a flow chart of an un-necessary code identification process in the embodiment of the present disclosure.

Therefore, in the above operation scheme, it is possible to identify the extracted event code as un-necessary in terms of storage in the second memory 20 (S280 in FIGS. 4 & 5). Therefore, the code identified as un-necessary can be, for example, selectively deleted from the second memory 20.

More practically, in the above embodiment, the identified un-necessary event code can be deleted from the second memory 20 as it is (S310 in FIGS. 4 & 5).

In the original un-necessary code identification processing, after the un-necessary code identification result is notified (S290 in FIG. 4), the identified code is deleted only after the delete instruction is transmitted from the destination of the notification (S300, S310 in FIG. 4). Therefore, the user on the notification destination can recognize the un-necessity of the code prior to performing the operation to instruct the deletion of the code for deleting the code from the second memory 20.

On the other hand, in the modified processing of the un-necessary code identification, the event code identified as un-necessary is immediately deleted (S280, s310 in FIG. 5). Therefore, the unnecessary event code can be automatically deleted from the second memory 20.

Also, in both cases, the un-necessity of the identified code can be notified for the user on the control unit 1 side, or on the external system side through the notification (S290 of FIG. 4).

Further, in the original processing, after the control program update in the first memory 14, the event code extraction is started at a timing of instruction reception from the outside system 100, thereby making it possible to identify and delete the un-necessary code (FIG. 4).

Also, in the modified processing, the event code extraction can automatically be started at a timing of starting up the control unit 1 after the control program update, thereby making it possible to automatically delete the un-necessary event code.

Further, in the modified processing, the event code extraction is started after the transitional condition of the controlled object is finished, that is, after the controlled object enters into the stably-controlled condition, thereby making it possible to avoid a timing of, for example, just after a start of control of the controlled object. That is, in other words, the processing load peak time can be avoided for automatically performing the identification and deletion of the un-necessary event code.

Further, in the modified processing, the event code extraction is started after the controlled object diagnosis has been normally finished, thereby making it possible to automatically perform the event code identification and deletion in a condition that the controlled object is normally controlled by various diagnoses.

Further, in the original processing, from among the event codes included in the instruction from the outside, the un-matching event code that does not match any code in the event code group can be extracted (S260 in FIG. 4). Therefore, the event code in the instruction from the outside system 100 can be selectively compared with the event codes in the event code group, thereby making it possible to examine and identify whether each of the event codes in the instruction is un-necessary or not for the purpose of deletion.

Also, in the above embodiment, the un-necessary event code can be promptly extracted by referring to the data table (S250, 260 in FIGS. 4 & 5).

(4) Modified Embodiment

Although the present disclosure has been fully described in connection with preferred embodiment thereof with reference to the accompanying drawings, it is to be noted that various changes and modifications will become apparent to those skilled in the art.

For example, in the above embodiment, the control unit is described as an example of controlling a vehicle. However, the control unit may control a controlled object that is different from the vehicle.

Further, in the above embodiment, the event code is a diagnosis code corresponding to an "abnormality" event generated in the controlled object or in the control unit 1. However, the event code may correspond to a non-abnormal event.

The regulation (OBD2) implemented by California Air Resources Board (CARB) defines a provision that diagnosis results that are stored as abnormality information (i.e., Diagnostic Trouble Code (DTC), or Fault Code) should be stored as a permanent fault code or a permanent DTC (PDTC). In view of the above regulation, the event code stored in the first memory 14 may correspond to the abnormality information (DTC), and the event code stored in the second memory 20 may correspond to the PDTC.

Such changes, modifications, and summarized scheme are to be understood as being within the scope of the present disclosure as defined by appended claims.

(5) Correspondence of the Embodiment with Claim Language

In the above embodiment, S260 in FIGS. 4 & 5 is an extraction unit in claim language, S280 is a determination unit, S290 is a notification unit, and S310 is a code delete unit.

What is claimed is:
1. A control unit for a vehicle comprising:
a first non-volatile memory for storing a control program and a reference table, the control program controlling a controlled object and detecting an abnormality, the reference table including possible events generated by the controlled object and event codes representing the possible events as an event code group, the possible events being the abnormality of the controlled object, and the event codes being data regarding the abnormality to be stored;
a second non-volatile memory for storing an event code corresponding to an event generated by the controlled object;
a discrepancy check unit for determining whether the event code stored in the second non-volatile memory does not match any one of the event codes of the event code group in the reference table that is stored in the first non-volatile memory when the control program for detecting the abnormality and the reference table stored in the first non-volatile memory are updated under an instruction from an external device, wherein the event code that does not match any one of the event codes in the reference table that is stored in the first non-volatile memory represents that the abnormality is no longer detected by the control program, which is updated;
a determination unit for determining an unnecessary event code as the event code determined as not matching by the discrepancy check unit, wherein the unnecessary event code is not required to be stored in the second non-volatile memory; and
a result notification unit for notifying a determination result by the determination unit.
2. The control unit of claim 1, wherein
the discrepancy check unit checks if the event code is included when the control unit is started after the update of the control program and the reference table stored in the first non-volatile memory.
3. The control unit of claim 1, wherein
the discrepancy check unit starts checking if the event code is included when the controlled object gets out of a transitional period of control start time to enter into a stably-controlled condition after the update of the control program and the reference table stored in the first non-volatile memory.

4. The control unit of claim 1, wherein,
if a process for diagnosing the controlled object is configured to be executed for various diagnoses after a start of control of the controlled object according to the control program,
the discrepancy check unit starts checking if the event code is included when the process for diagnosing the controlled object has normally ended after the update of the control program and the reference table in the first non-volatile memory.

5. The control unit of claim 1, wherein
the discrepancy check unit checks, from among the event codes specified in an instruction, an event code that does not match any one of the event codes in the event code group, when the discrepancy check unit receives, from outside of the control unit, the instruction for specifying a specific event code, and the specified event code is stored in the second non-volatile memory.

6. The control unit of claim 1, wherein,
in case that the control program and the reference table stored in the first non-volatile memory are updated together, and
the discrepancy check unit checks, from among the event codes stored in the second non-volatile memory, an event code that does not match any one of the event codes registered in the reference table after the update of the control program and the reference table stored in the first non-volatile memory.

7. The control unit of claim 1, wherein
the control unit is an electronic control unit disposed in a vehicle,
the event is a trouble condition generated in the controlled object, and
the event code is a trouble code of predetermined trouble information for detecting and storing the trouble condition when the electronic control unit performs a diagnosis of the controlled object.

8. The control unit of claim 1, wherein
the event code stored in the first non-volatile memory is a diagnostic trouble code (DTC), the DTC being abnormity information, and
the event code stored in the second non-volatile memory is a permanent diagnostic trouble code (PDTC).

9. The control unit of claim 1, wherein
the second non-volatile memory is an EEPROM, and
when the control program and reference table stored in the first non-volatile memory are updated during a re-program, the event code stored in the second non-volatile memory before the re-program remain after the re-program.

10. The control unit of claim 1, wherein an instruction to delete the unnecessary event code identified by the determination unit is provided by the external device coupled to the control unit based on a notification from the result notification unit.

11. The control unit of claim 1, wherein the control unit is an engine Engine Control Unit (ECU).

12. The control unit of claim 1, wherein the control unit implements a technique in compliance with On-Board Diagnostics regulations.

13. The control unit of claim 1, wherein the external device is a vehicle diagnostic scan tool.

14. A control unit comprising:
a first non-volatile memory for storing a control program and a reference table, the control program controlling a controlled object and detecting an abnormality, the reference table including possible events generated by the controlled object and event codes representing the possible events as an event code group, the possible events being the abnormality of the controlled object, and the event codes being data regarding the abnormality to be stored;
a second non-volatile memory for storing an event code corresponding to an event generated by the controlled object;
a discrepancy check unit for determining whether the event code stored in the second non-volatile memory does not match any one of the event codes of the event code group in the reference table that is stored in the first non-volatile memory when the control program for detecting the abnormality and the reference table stored in the first non-volatile memory are updated under an instruction from an external device, wherein the event code that does not match any one of the event codes in the reference table that is stored in the first non-volatile memory represents that the abnormality is no longer detected by the control program, which is updated;
a determination unit for determining an unnecessary event code as the event code determined as not matching by the discrepancy check unit, wherein the unnecessary event code is not required to be stored in the second non-volatile memory; and
a code delete unit for deleting the unnecessary event code determined by the determination unit from among the event codes stored in the second non-volatile memory.

15. The control unit of claim 14, wherein
the event code stored in the first non-volatile memory is a diagnostic trouble code (DTC), the DTC being abnormity information, and
the event code stored in the second non-volatile memory is a permanent diagnostic trouble code (PDTC).

16. The control unit of claim 14, wherein
the second non-volatile memory is an EEPROM, and
when the control program and reference table stored in the first non-volatile memory are updated during a re-program, the event code stored in the second non-volatile memory before the re-program remain after the re-program.

17. The control unit of claim 14, wherein the code delete unit deletes the unnecessary event code based on an instruction provided by the external device coupled to the control unit.

18. A non-transitory computer-readable storage medium storing instructions for controlling a computer to perform steps comprising:
storing, in a first non-volatile memory, a control program and a reference table, wherein the control program controls a controlled object and detects an abnormality, the reference table includes possible events generated by the controlled object and event codes represents the possible events as an event code group, the possible events being the abnormality of the controlled object, and the event codes being data regarding the abnormality;
storing, in a second non-volatile memory, an event code that corresponds to an event generated by the controlled object;
performing a discrepancy check including checking if the event code in the second non-volatile memory does not match any one of the event codes of the event code group in the reference table that is stored in the first non-volatile memory when the control program and the reference table stored in the first non-volatile memory are updated under an instruction from an external device, wherein the event code that does not match any one of the event codes in the reference table that is stored in the first non-volatile memory represents that the abnormality is no longer detected by the control program that is updated;

determining the event code that is determined as not matching by the discrepancy check as an unnecessary event code that is not required to be stored in the second non-volatile memory; and providing a notification of a determination result of determining the event code as not matching.

19. The non-transitory computer-readable medium of claim 18, wherein
the event code stored in the first non-volatile memory is a diagnostic trouble code (DTC), the DTC being abnormity information, and
the event code stored in the second non-volatile memory is a permanent diagnostic trouble code (PDTC).

20. The non-transitory computer-readable medium of claim 18, wherein
the second non-volatile memory is an EEPROM, and
when the control program and reference table stored in the first non-volatile memory are updated during a re-program, the event code stored in the second non-volatile memory before the re-program remain after the re-program.

21. The non-transitory computer-readable medium of claim 18, wherein an instruction to delete the unnecessary event code is provided by the external device coupled to the control unit based on the notification.

22. A non-transitory computer-readable storage medium storing instructions for controlling a computer to perform steps comprising:
storing, in a first non-volatile memory, a control program and a reference table, wherein the control program controls a controlled object and detects an abnormality, the reference table includes possible events generated by the controlled object and event codes represents the possible events as an event code group, the possible events being the abnormality of the controlled object, and the event codes being data regarding the abnormality;

storing, in a second non-volatile memory, an event code that corresponds to an event generated by the controlled object;

performing a discrepancy check including checking if the event code in the second non-volatile memory does not match any one of the event codes of the event code group in the reference table that is stored in the first non-volatile memory when the control program and the reference table stored in the first non-volatile memory are updated under an instruction from an external device, wherein the event code that does not match any one of the event codes in the reference table that is stored in the first non-volatile memory represents that the abnormality is no longer detected by the control program that is updated;

determining the event code that is determined as not matching by the discrepancy check as an unnecessary event code that is not required to be stored in the second non-volatile memory; and deleting the unnecessary event code from the second non-volatile memory.

23. The non-transitory computer-readable medium of claim 22, wherein
the event code stored in the first non-volatile memory is a diagnostic trouble code (DTC), the DTC being abnormity information, and
the event code stored in the second non-volatile memory is a permanent diagnostic trouble code (PDTC).

24. The non-transitory computer-readable medium of claim 22, wherein
the second non-volatile memory is an EEPROM, and
when the control program and reference table stored in the first non-volatile memory are updated during a re-program, the event code stored in the second non-volatile memory before the re-program remain after the re-program.

25. The non-transitory computer-readable medium of claim 22, wherein an instruction to delete the unnecessary event code is provided by the external device coupled to the control unit.

26. The non-transitory computer-readable medium of claim 22, wherein the external device is a vehicle diagnostic scan tool.

* * * * *